United States Patent
Watanabe

(10) Patent No.: US 7,912,168 B2
(45) Date of Patent: Mar. 22, 2011

(54) WIRELESS COMMUNICATION APPARATUS AND METHOD THEREOF

(75) Inventor: Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 11/948,896

(22) Filed: Nov. 30, 2007

(65) Prior Publication Data
US 2008/0152056 A1    Jun. 26, 2008

(30) Foreign Application Priority Data

Dec. 20, 2006   (JP) .............................. P2006-342031

(51) Int. Cl.
*H04L 7/00*    (2006.01)
(52) U.S. Cl. ....................................................... 375/355
(58) Field of Classification Search ................... 375/355
See application file for complete search history.

(56) References Cited

U.S. PATENT DOCUMENTS

| 5,905,767 A | * | 5/1999 | Fujimura | ..................... 375/355 |
| 2002/0167991 A1 | | 11/2002 | Suzuki | |

FOREIGN PATENT DOCUMENTS

JP    2003-32225    1/2003

* cited by examiner

*Primary Examiner* — David C Payne
*Assistant Examiner* — Tanmay K Shah
(74) *Attorney, Agent, or Firm* — Finnegan, Henderson, Farabow, Garrett & Dunner, L.L.P.

(57) ABSTRACT

A wireless communication apparatus for performing reception processing while tracking a symbol timing obtained by synchronization, the wireless communication apparatus includes a resampler for performing resampling to oversample a received symbol in a plurality of phases by using a sampling rate higher than a symbol rate, a phase-error detector for obtaining a phase error in a time sequence at each of sampling points where the resampling is performed, an error-signal generator for generating an error signal on the basis of the phase error detected at each of the sampling points where the resampling is performed, and a sampling point controller for detecting an offset direction at each of the sampling points on the basis of the error signal and for controlling an offset direction of each of the sampling points of the received symbol.

6 Claims, 10 Drawing Sheets

Ich EYE PATTERN

WIRELESS COMMUNICATION APPARATUS AND METHOD THEREOF

CROSS REFERENCES TO RELATED APPLICATIONS

The present invention contains subject matter related to Japanese Patent Application JP 2006-342031 filed in the Japanese Patent Office on Dec. 20, 2006, the entire contents of which are incorporated herein by reference.

BACKGROUND OF THE INVENTION

1. Field of the Invention

The present invention relates to a wireless communication apparatus which receives a radio signal transmitted from a transmitter and a wireless communication method. The present invention relates more particularly to a wireless communication apparatus which receives a radio signal encoded and digitally modulated by a transmitter and a wireless communication method.

More specifically, the present invention relates to a wireless communication apparatus which performs reception processing while performing symbol tracking so as not to lose synchronized symbol timing obtained under conditions in which a frequency shift exists between an oscillator mounted in a transmitter and that mounted in a receiver, and to a wireless communication method. In particular, the present invention relates to a wireless communication apparatus which is applicable to a constant envelope modulation system and performs symbol tracking without substantially increasing any burden to an analog-to-digital (A/D) converter in order to accelerate a symbol rate, and a wireless communication method thereof.

2. Description of the Related Art

Wireless communication encompasses a wide range of roles from high-capacity trunks such as terrestrial broadcasting, terrestrial microwave communication, satellite communication, or satellite broadcasting to access lines such as mobile communication lines. Recently, digital wireless communication, which involves transmission of digital data via radio waves, such as digital broadcasting or a wireless local area network (LAN) has become popular.

In digital wireless communication, source and channel coding and digital modulation are performed on a transmission signal by a transmitter. Digital demodulation and source and channel decoding, which are the reverse of the processing performed by the transmitter, are performed by a receiver. According to digital communication techniques, high-speed and high-capacity communication can be realized. Moreover, noise immunity, interference immunity, and distortion immunity increase, and thereby high-quality communication can be realized.

In digital wireless communication, for example, a spread spectrum (SS) system can be used. That is, a digital transmission signal which is spread using a signal called a spread code to have a band wider than the original digital signal is transmitted from the transmitter. The transmitted signal is decoded into the original digital signal by using the same spread code at the receiver. According to an SS system, a required C/I level for realizing normal communication can be set to be lower than 0 dB even in an environment where communication systems with the same frequency band exist. Such an SS system is used in wireless LANs with IEEE 802.11 series, Bluetooth communication, CDMA cellular telephones, and the like. SS systems include a direct-sequence spread spectrum (DSSS) system in which an occupied band is spread by multiplying an information signal at a transmitter by a series of random codes, referred to as a pseudo-noise (PN) code, and a frequency hopping spread spectrum (FHSS) system in which a carrier is switched rapidly among many frequency channels.

In wireless communication, a transmitter and a receiver each have a local oscillator mounted therein. There exists a slight error, namely, a frequency offset, between frequencies of such local oscillators mounted in the transmitter and the receiver. For example, in the case of a wireless LAN, oscillators accurate to about 20 ppm are employed. Such an error between the local oscillators located in analog sections of the transmitter and the receiver is observed as a phenomenon in which reception sampling points shift with the passage of time at the receiver. The shift of the reception sampling points not only causes a signal-to-noise (SN) ratio of the reception sampling points to decrease but also causes a serious problem that the reception data is not demodulated into the original data if the amount of the shift becomes more than one symbol period.

FIG. 9 shows an eye pattern of a reception signal. An eye pattern is a diagram showing parts of a waveform of a signal extracted in predetermined time intervals, which are superposed in the same region. Even in the case where sampling is performed at a point A with a high SN ratio in FIG. 9, if a frequency offset exists between the transmitter and the receiver, a sampling point shifts from the point A to a point B and the SN ratio of the sampling point decreases.

In order to solve such a problem, it is necessary that reception processing be performed by the receiver in consideration of the frequency error between the transmitter and the receiver. One of such reception method is to provide a scheme in which symbol timing is regenerated so as to follow the frequency offset between the transmitter and the receiver and not to lose synchronized symbol timing obtained in the communication system. Such a scheme is referred to as "symbol tracking".

FIG. 10 shows a functional block diagram of a symbol tracking device. A shown example employs a tracking system called a delay locked loop, which is generally used in a DSSS system (see, FIG. 12 of Japanese Unexamined Patent Application Publication No. 2003-32225; and Mitsuo Yokoyama, "Supekutoru-Kakusan Tsushin Shisutemu (Spread Spectrum Communication System)," Kagaku-Gijutsu Shuppansha, 1988). In the tracking system, an error signal is generated by obtaining a difference between integrated amplitude values of signals which are sampled at points $T_c/2$ before and after a target sampling point, which are Early and Late points, respectively, where $T_c$ represents a symbol period, and thereby symbol tracking is performed. Note that the shown example assumes a DSSS system; however, the shown example may also be used in communication systems besides SS systems.

Such a symbol tracking system employs an amplitude value as tracking information. Thus, if a constant envelope modulation system in which an amplitude of a high-frequency signal does not temporally change, such as $\pi/2$ shift binary phase-shift keying (BPSK), is used, there is a problem that it is difficult to obtain a difference between the integrated amplitude values at the Early and Late points. In addition, generally, X-times (X being natural number 4 or higher) oversampling is performed on each symbol, and a processing load on an A/D converter increases in accordance with an increased symbol rate.

SUMMARY OF THE INVENTION

It is desirable to provide a superior wireless communication apparatus configured to perform reception processing while performing symbol tracking so as not to lose synchronized symbol timing obtained in a communication environment where there is a frequency offset between an oscillator mounted in a transmitter and an oscillator mounted in a receiver, and a superior wireless communication method thereof.

It is desirable to provide a superior wireless communication apparatus which is applicable to a constant envelope modulation system and in which symbol tracking can be performed without increasing a processing load on an A/D converter in accordance with an increased symbol rate, and a superior wireless communication method.

According to an embodiment of the present invention, there is provided a wireless communication apparatus for performing reception processing while tracking a symbol timing obtained by synchronization, the wireless communication apparatus includes a resampler for performing resampling to oversample a received symbol in a plurality of phases by using a sampling rate higher than a symbol rate, a phase-error detector for obtaining a phase error in a time sequence (a current symbol and a previous symbol) at each of sampling points where the resampling is performed, an error-signal generator for generating an error signal on the basis of the phase error detected at each of the sampling points where the resampling is performed, and a sampling point controller for detecting an offset direction at each of the sampling points on the basis of the error signal and for controlling an offset direction of each of the sampling points of the received symbol.

In wireless communication, there exists a frequency offset between an oscillator mounted in a transmitter and an oscillator mounted in a receiver. Because of the frequency offset, a phenomenon in which reception sampling points shift with the passage of time is observed at the receiver. This may cause a SN ratio of the reception sampling points to decrease and may cause a serious problem that the reception data is not successfully demodulated into the original data. Therefore, there is a demand for a scheme for regenerating symbol timing so as to follow the frequency offset between the transmitter and the receiver.

In a wireless communication apparatus according to an embodiment of the present invention, the wireless communication apparatus performs, for example, 2×oversampling on each symbol of received data. The wireless communication apparatus generates an error signal using as a metric a phase error at each of sampling points in a time sequence, detects a rotation direction of the symbol at each of the sampling points, and then controls an offset direction of the sampling point. That is, sampling points of symbols are specified by using an amount of change in phase as a metric, which is also effective in a constant envelope modulation system.

In a wireless communication apparatus according to an embodiment of the present invention, such an error signal is sampled at the timing a rotational angle of a symbol reaches a predetermined amount, thereby allowing symbol tracking using a sampling frequency twice as high as a symbol rate. The error signal is scaled on the basis of a frequency error; therefore, by sampling the error signal at the timing a sampling clock signal is supplied from one of the rotation-direction detectors, the error signal can be sampled at a predetermined rate in terms of a curvature. As a result, an accuracy of such detection may be improved.

Here, such a wireless communication apparatus may further include a squaring processor for raising the received symbol to the power of 2, and the resampler performs oversampling at a rate twice as high as the symbol rate. For example, in the case of BPSK, an information component is canceled by raising symbols to the power of 2. In the case of quadrature phase-shift keying (QPSK), an information component is canceled by raising symbols to the power of 4. In this case, an amount of change in phase detected in a rotation-direction detector, which may be included in the wireless communication apparatus, is twice as much as an actual frequency offset.

The wireless communication apparatus may further include a rotation-direction detector, and the rotation-direction detector may detect a rotation direction of a symbol in accordance with a quadrant of a sampling point located in a phase plane and a threshold.

According to an embodiment of the present invention, therefore, a superior wireless communication apparatus configured to perform reception processing while performing symbol tracking so as not to lose synchronized symbol timing obtained in a communication environment where there is a frequency offset between an oscillator mounted in a transmitter and an oscillator mounted in a receiver, and a superior wireless communication method can be achieved.

According to an embodiment of the present invention, therefore, a superior wireless communication apparatus which is applicable to a constant envelope modulation system and in which symbol tracking can be performed without increasing a processing load on an A/D converter in accordance with an increased symbol rate, and a superior wireless communication method can be achieved.

In a wireless communication apparatus according to an embodiment of the present invention, symbol tracking is performed by using phase error information as tracking information, and thus such symbol tracking may be also applicable to a constant envelope modulation system. Moreover, by detecting a rotation direction in phase, such symbol tracking may be digitally performed even in the case of 2× oversampling. Therefore, the wireless communication apparatus may handle an increase of a symbol rate in the case where the processing speed of a communication system increases.

In an embodiment of the present invention, symbol tracking is performed by using phase error information as tracking information, and thus such symbol tracking may be also applicable to a constant envelope modulation system. Moreover, by detecting a rotation direction in phase, such symbol tracking may be digitally performed even in the case of 2× oversampling.

Other features and advantages according to an embodiment of the present invention will be specifically described with reference to a detailed description based on embodiments of the present invention described below and the attached drawings.

DESCRIPTION OF THE PREFERRED EMBODIMENTS

Embodiments according to the present invention will be described below with reference to the drawings.

Figure 1:
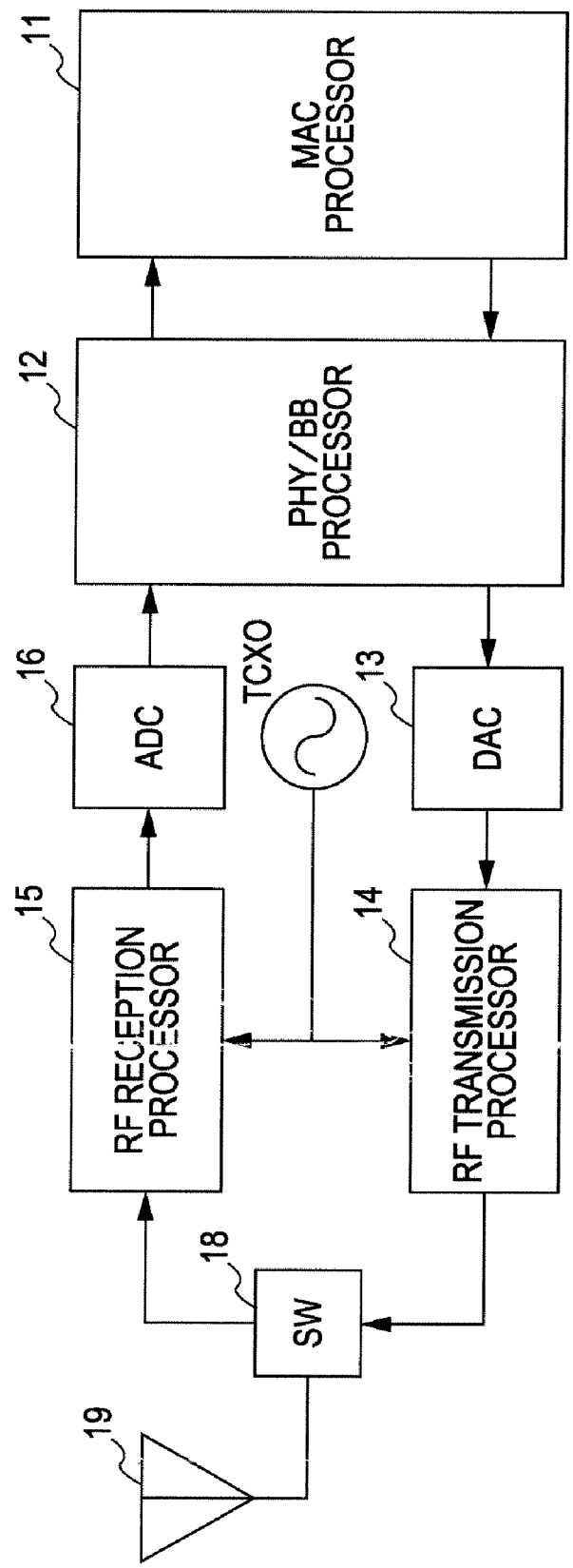
FIG. 1 is a block diagram showing a structure of a wireless communication apparatus according to an embodiment of the present invention.

FIG. 1 schematically shows a structure of a wireless communication apparatus to which an embodiment of the present invention is applicable. The wireless communication apparatus shown in FIG. 1 includes a transmission branch and a reception branch. The transmission branch includes a media access control (MAC) processor 11 for performing processing of a MAC layer protocol, a PHY/BB processor 12 for performing processing of a physical (PHY) layer protocol and a baseband (BB) layer protocol, a digital-to-analog converter (DAC) 13 for converting a digital transmission signal to an analog transmission signal, and a radio frequency (RF) transmission processor 14 for performing RF processing on the analog transmission signal. The reception branch includes an RF reception processor 15 for performing RF processing on an analog reception signal and an analog-to-digital converter (ADC) 16 for converting the analog reception signal to a digital reception signal. An antenna 19 is shared by the transmission and reception branches via an antenna switch (SW) 18.

The system shown in FIG. 1 includes a local oscillator, which is not a voltage-controlled oscillator (VCO) but a temperature-compensated crystal oscillator (TCXO). The PHY/BB processor 12 performs baseband processing including oversampling to digitally perform symbol tracking. In the shown system, feedback control of the local oscillator is not performed, and thus the circuit structure of the system is simple. However, a sampling frequency for the A/D conversion is sufficiently high.

Figure 2:
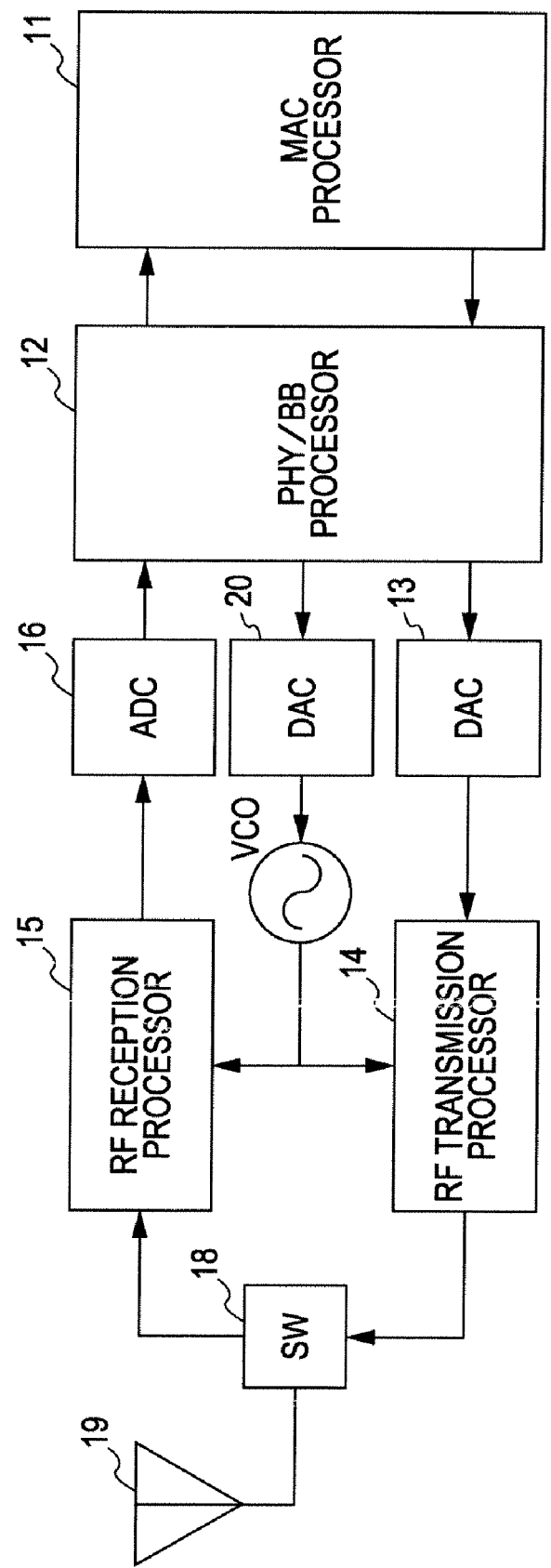
FIG. 2 is a block diagram showing a structure of a wireless communication apparatus according to another embodiment of the present invention.

FIG. 2 schematically shows an example structure of a wireless communication apparatus to which another embodiment of the present invention is applicable. The wireless communication apparatus shown in FIG. 2 includes a transmission branch and a reception branch. The transmission branch includes the MAC processor 11, the PHY/BB processor 12, the DAC 13, and the RF transmission processor 14. The reception branch includes the RF reception processor 15 and the ADC 16. The antenna 19 is shared by the transmission and reception branches via the SW 18 (The elements of the wireless communication apparatus shown in FIG. 2 are similar to those of the wireless communication apparatus shown in FIG. 1.).

In the system shown in FIG. 2, a VCO is used as a local oscillator, and feedback control of operations of the VCO is performed by the PHY/BB processor 12. In this case, although a high sampling frequency is not necessary for the ADC 16 or DAC 13, there is a tradeoff between the sampling frequency and the stability in tracking control. That is, instead of not requesting a certain sampling frequency of the ADC 16 and that of the DAC 13, the tracking control is affected by analog circuit characteristics due to a loop formed between the RF processor and the baseband circuit. In addition, the system further includes a DAC 20 for controlling the VCO.

The following description will be made in the context of the system structure shown in FIG. 1, which does not include the VCO.

In wireless communication, there is generally a frequency offset between an oscillator of a transmitter and an oscillator of a receiver. Thus, the receiver performs tracking compensation of symbol sampling of a reception signal while taking the frequency offset into account.

In an embodiment, a wireless communication apparatus performs, for example, 2× oversampling on each symbol of received data. The wireless communication apparatus generates an error signal using as a metric a phase error at each of sampling points in a time sequence, detects a rotation direction of the symbol at each of the sampling points, and then controls an offset direction of the sampling point. That is, sampling points of symbols are specified by using an amount of change in phase as a metric, which is also effective in a constant envelope modulation system.

In the embodiment, such an error signal is sampled at the timing a rotational angle of a symbol reaches a predetermined amount, thereby allowing symbol tracking using a sampling frequency twice as high as a symbol rate.

Figure 3:
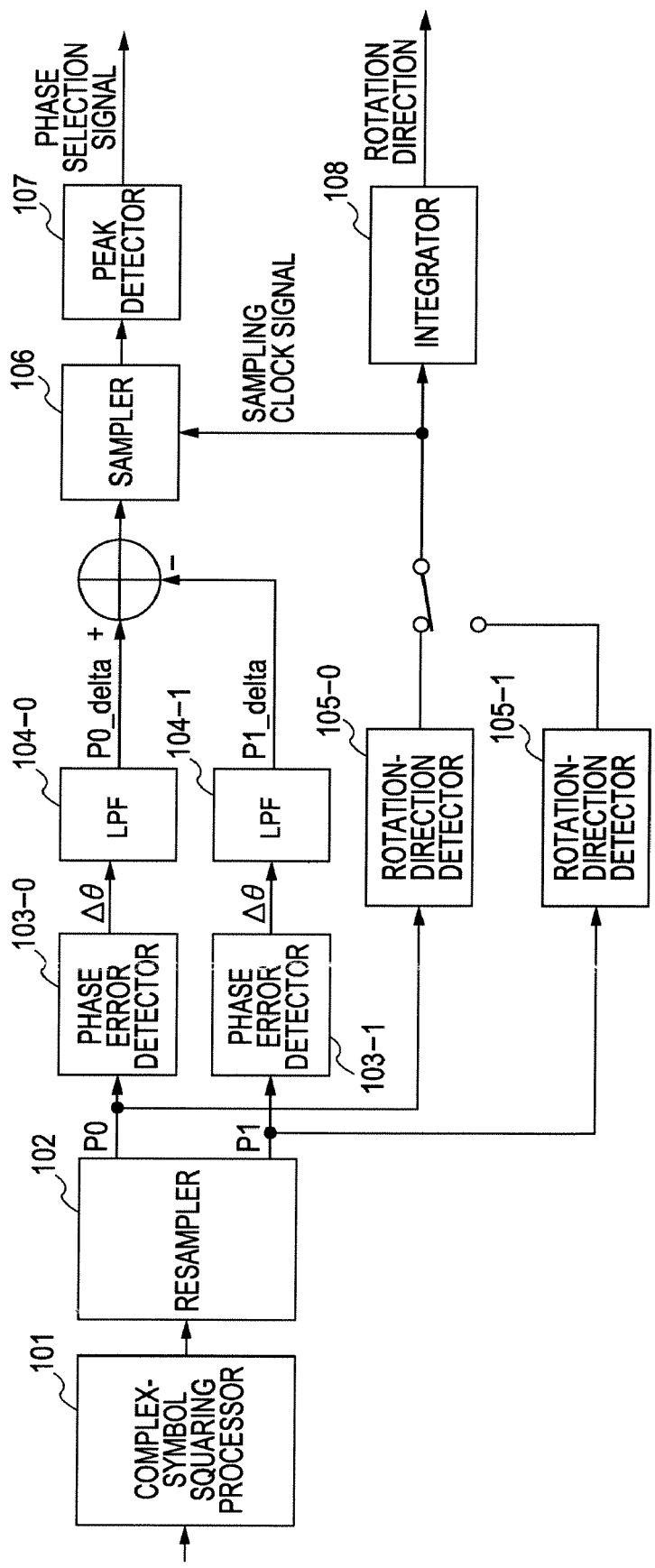
FIG. 3 is a block diagram showing a structure of a circuit which performs symbol tracking.

FIG. 3 shows a structure of a circuit for symbol tracking. Here, π/2-shift BPSK is employed as a modulation system, and the degree of oversampling is two.

A complex-symbol squaring processor 101 cancels an information component by raising symbols to the power of 2. In the case of BPSK, an information component is canceled by raising symbols to the power of 2. In the case of QPSK, an information component is canceled by raising symbols to the power of 4.

Figure 4:
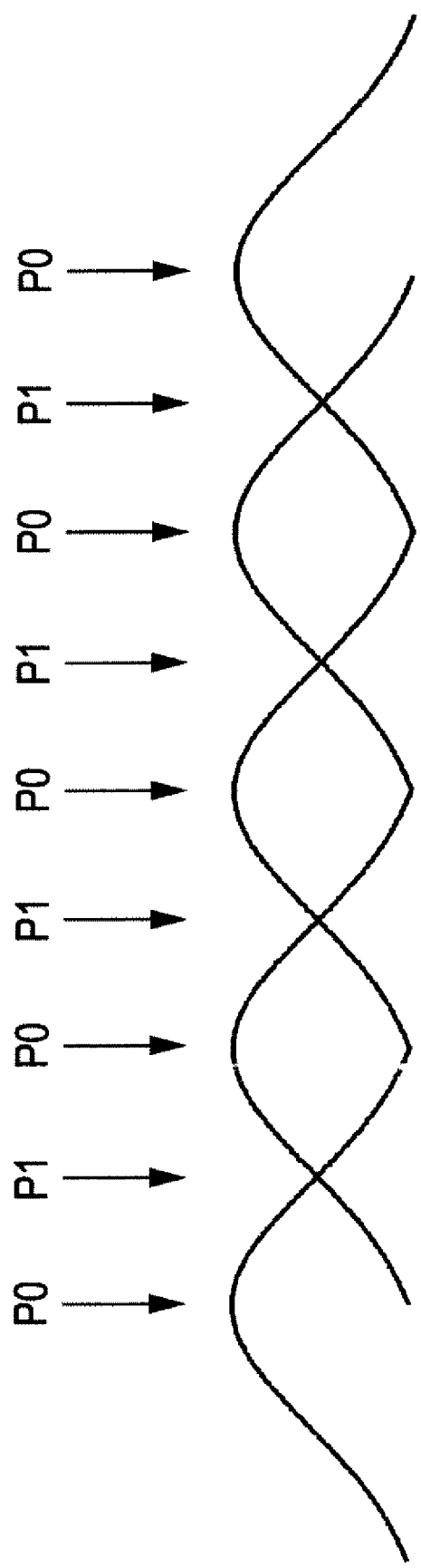
FIG. 4 is a diagram showing symbols and sampling timing of phases P0 and P1 in the case of 2× oversampling.

A resampler 102 classifies the symbols raised to the power of 2 on a phase basis. Since 2× oversampling is performed in the embodiment, the resampler 102 resamples the symbols raised to the power of 2 into two phases, P0 and P1. The phase P0 is a phase of a demodulated signal, and the phase P1 is a phase where oversampling is performed. FIG. 4 shows symbols and sampling timings P0 and P1 in 2× oversampling.

Phase error detectors 103-0 and 103-1 are provided for the phases P0 and P1, respectively. Each of the phase error detectors 103-0 and 103-1 detects a phase error $\Delta\theta$ at each sampling point in a time sequence. That is, the phase error detectors 103-0 and 103-1 obtain the phase error $\Delta\theta$ between a current symbol and a previous symbol at the phases P0 and P1 where oversampling is performed, and determine a phase offset of the carrier. In the embodiment, a phase offset within a symbol is detected by determining the amount obtained by differentiating a phase rotation in consideration of a phase error generated in symbol transition (that is, a spread of a constellation).

Outputs from the phase error detectors 103-0 and 103-1 are band-limited by low-pass filters (LPFs) 104-0 and 104-1, respectively, to generate angular difference signals P0_Delta and P1_Delta at the phases P0 and P1, respectively, where resampling is performed. The difference between the angular difference signals P0_Delta and P1_Delta becomes an error signal Error. That is, such an error signal is generated by using as a metric a phase error at each sampling point of a symbol in a time sequence, the phase error being as the measurement basis (metric quantity).

Rotation-direction detectors 105-0 and 105-1 are provided for the phases P0 and P1, respectively. The rotation-direction detectors 105-0 and 105-1 each detect a rotation direction of each of the symbols raised to the power of 2 at the phases P0 and P1, respectively. In the embodiment, a circuit which generates a pulse having a value of "+1" or "−1" at every predetermined angle is employed. Since the complex-symbol squaring processor 101 performs a square operation, an amount of change in phase is twice as much as an actual frequency offset.

A sampler 106 employs as a drive clock a pulse generated from either of the rotation-direction detectors 105-0 and 105-1 of the phases P0 and P1, and samples the value of the error signal Error every time a phase rotation of a symbol raised to the power of 2 reaches a predetermined angle. That is, the sampler 106 can sample a phase error of a symbol at a rate corresponding to a frequency error of the symbol, resulting in more accurate processing at a peak detector 107 located downstream.

The peak detector 107 obtains a peak of a phase error signal. An output from the peak detector 107 becomes a phase selection signal for selecting one of the phases P0 and P1 where the symbols are oversampled, the selected phase being used to determine sampling points used for demodulating symbols. A peak of the phase error signal (that is, a vertex of each of the angular difference signals P0_Delta and P1_Delta where a polarity of the corresponding angular difference signal changes) indicates a transitional point between adjacent symbols. By changing sampling timing from P0 to P1, symbol tracking can be achieved.

Figure 5:
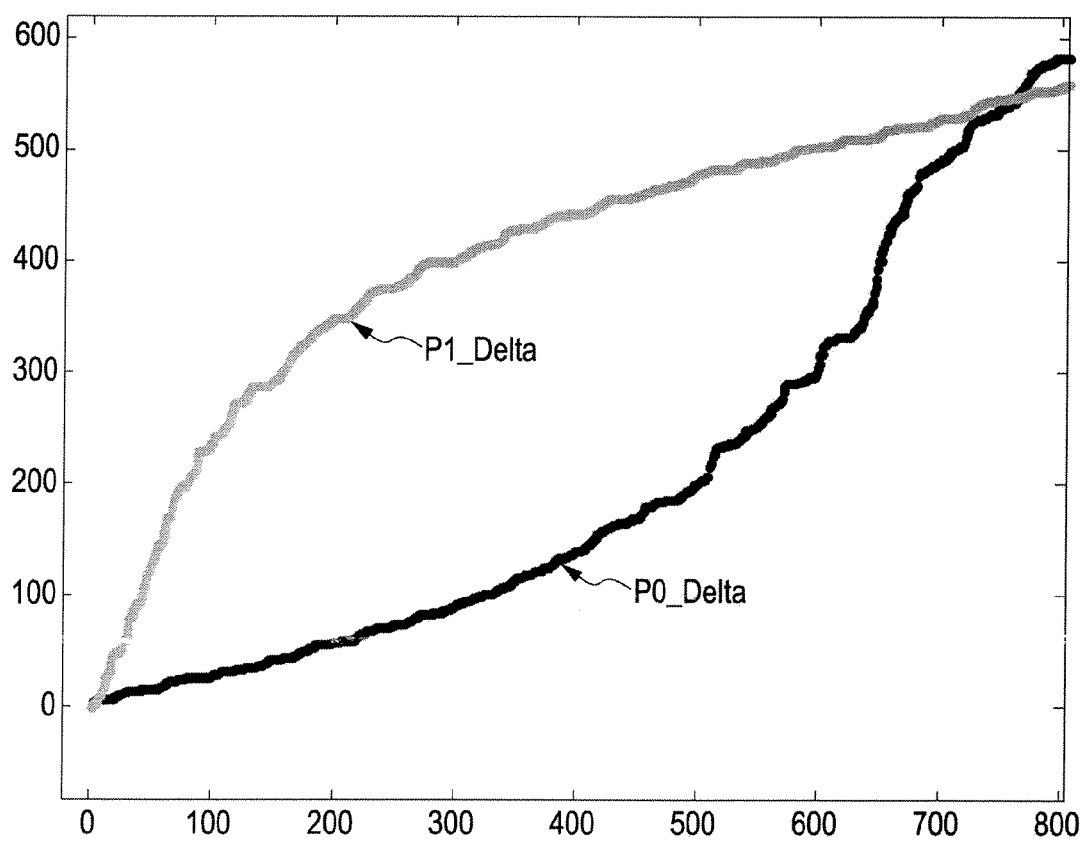
FIG. 5 is a diagram showing angular difference signals P0_Delta and P1_Delta.

FIG. 5 shows the angular difference signals P0_Delta and P1_Delta. In the FIG. 5, the angular difference signal P0_Delta serves as demodulation sampling timing. The frequency offset causes a sampling point specified by the phase P0 to move toward an end of a corresponding symbol, and thus an angle error increases and the amount of the change of the angular difference signal P0_Delta increases. On the other hand, the frequency offset causes a sampling point specified by the phase P1 to move from an end of a corresponding symbol, where the angle error becomes large, to the center of the symbol, and thus the amount of the change of the angular difference signal P1_Delta gradually becomes small.

Figure 6:
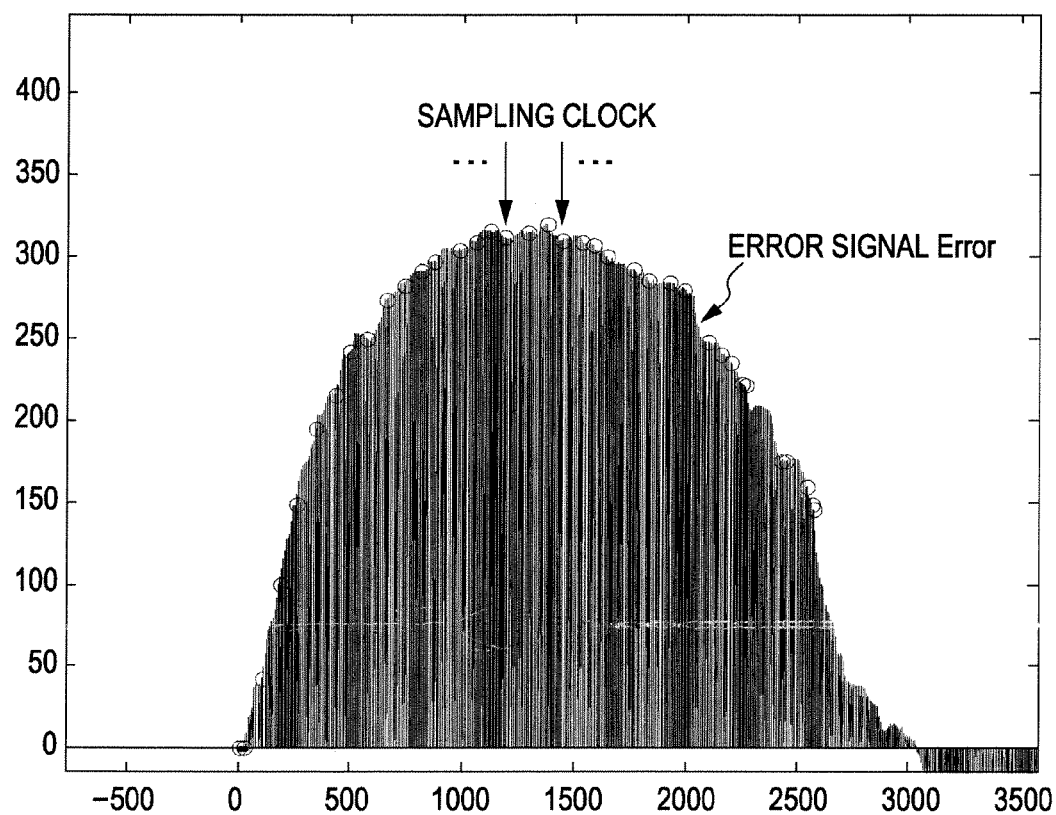
FIG. 6 is a diagram showing an error signal Error, which is the difference between the angular difference signals P0_Delta and P1_Delta, and the timing a sampling clock signal is supplied from a rotation-direction detector.

FIG. 6 shows the error signal Error that is the difference between the angular difference signals P0_Delta and P1_Delta, and the timing a sampling clock signal is supplied from one of the rotation-direction detectors. As shown in FIG. 6, the error signal Error has a peak portion having a convex shape at the timing an increasing amount of the angular difference signal P0_Delta becomes larger or smaller than that of the angular difference signal P1_Delta. At this timing, the sampling points specified by the phase P0 are switched to those specified by the phase P1.

In addition, the error signal Error is scaled on the basis of the frequency error; therefore, by sampling the error signal Error at the timing the sampling clock signal is supplied from one of the rotation-direction detectors 105-0 and 105-1 as shown in FIG. 6, the error signal Error can be sampled at a predetermined rate in terms of a curvature. As a result, an accuracy of detecting a peak may be improved.

Figure 7A:
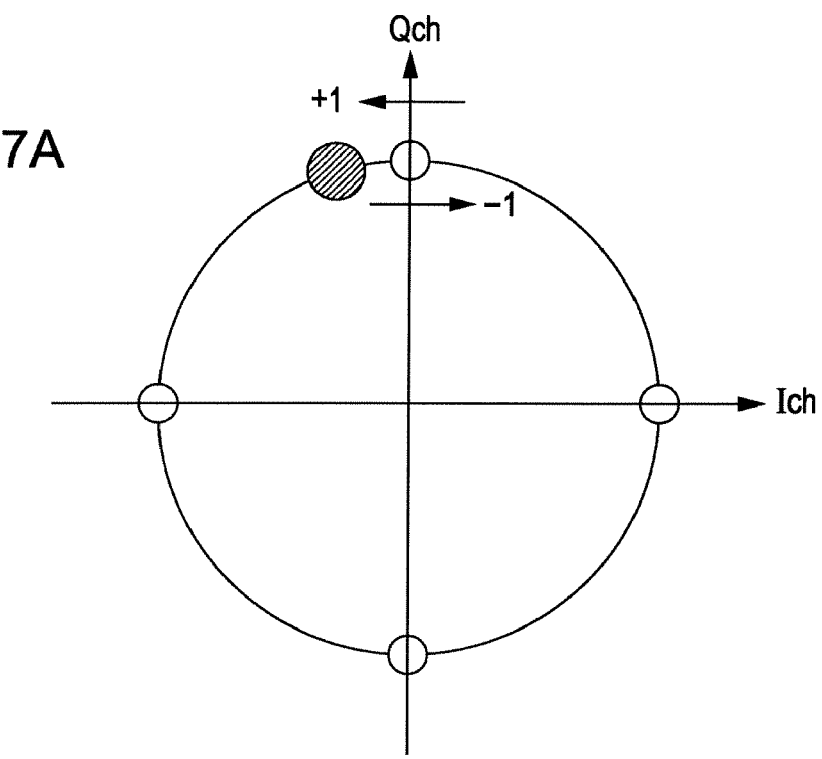
FIG. 7A is a conceptual diagram showing a structure for detecting a rotation of a symbol at a degree of 90°, the detection being performed by the rotation-direction detector.
Figure 7B:
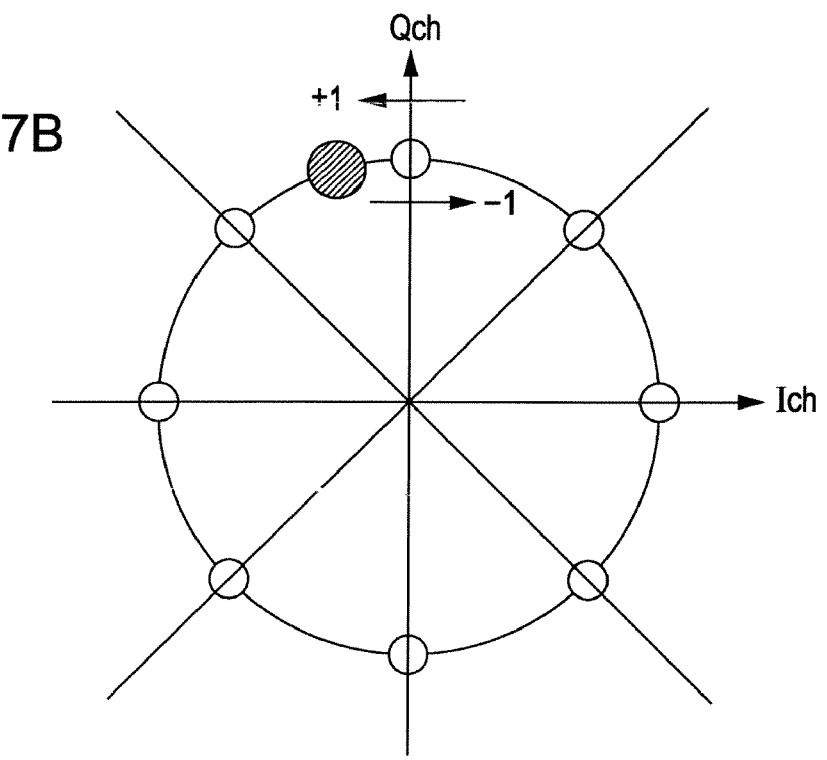
FIG. 7B is a conceptual diagram showing a structure for detecting a rotation of a symbol at a degree of 45°, the detection being performed by the rotation-direction detector.

Next, the mechanism of the rotation-direction detector 105, which is a generic name for the rotation-direction detectors 105-0 and 105-1, will be specifically described. At the rotation-direction detector 105, a pulse is generated according to the amount of rotation of a symbol (as described above). FIGS. 7A and 7B show conceptual diagrams of a mechanism in which the rotation-direction detector 105 detects the rotation of a symbol at degrees of 90° and 45°, respectively. As shown in FIG. 7A, the rotation-direction detector 105 outputs a value "+1" or "−1" in accordance with a crossing direction of the symbol with reference to an I axis and a Q axis in an I-Q phase plane. Therefore, the rotation-direction detector 105 can detect the rotation of a symbol in every 90°. Moreover, in the FIG. 7B, there are additional axes y=x and y=−x besides the I and Q axes, and thereby the rotation-direction detector 105 can detect the rotation of a symbol in every 45°.

Figure 8:
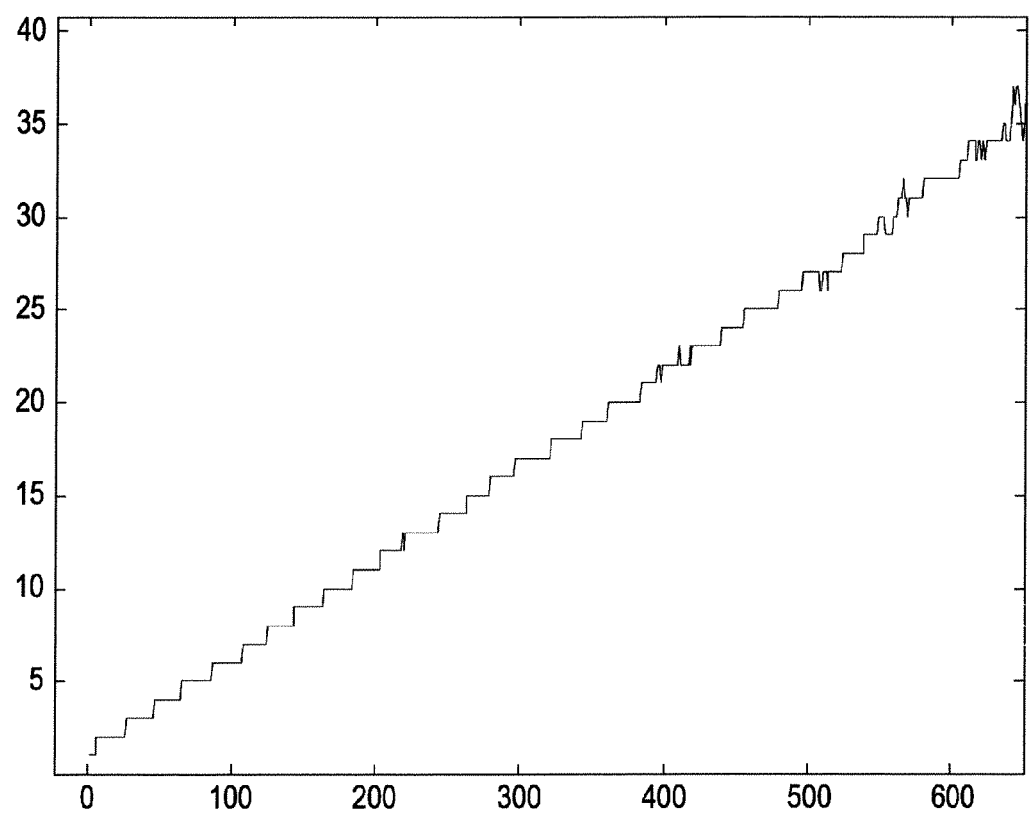
FIG. 8 is a diagram showing an exemplary result of the integral of an output from the rotation-direction detector, the integral being performed in an integrator located downstream.
Figure 9:
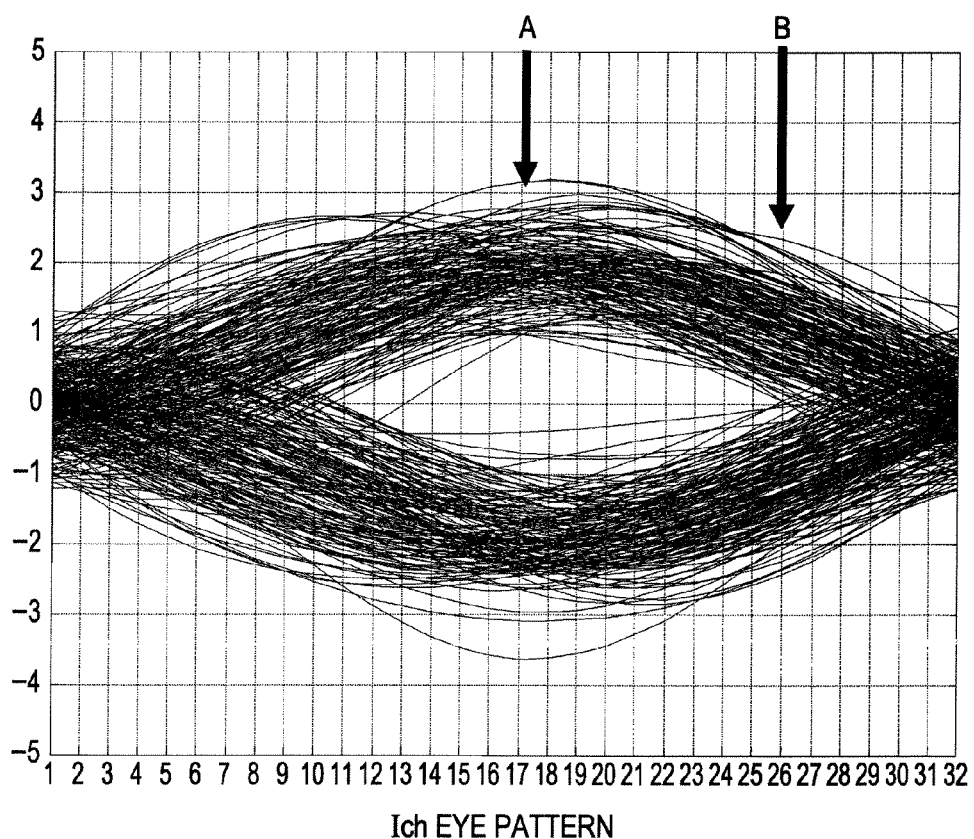
FIG. 9 is a diagram showing an eye pattern of a reception signal.
Figure 10:
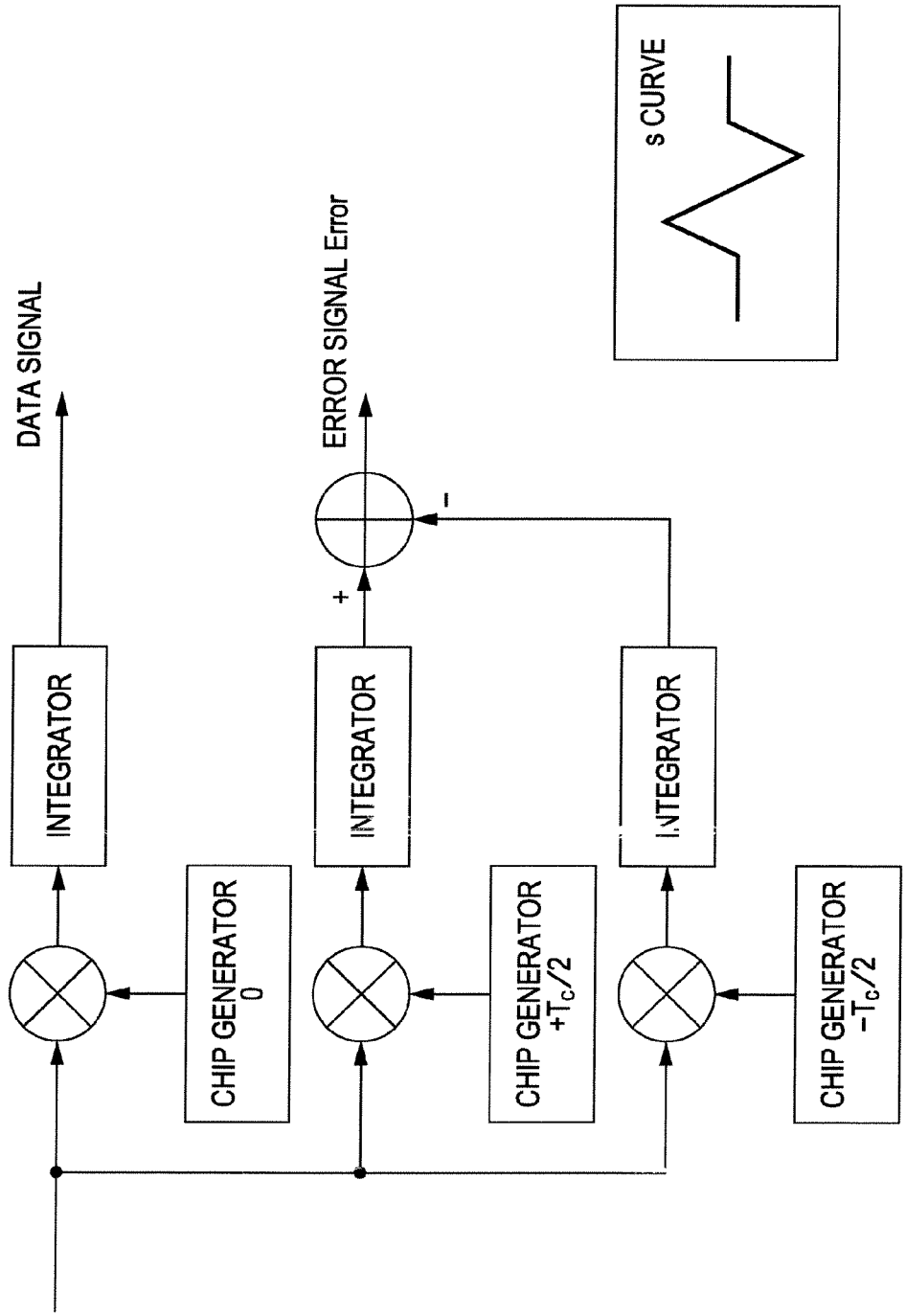
FIG. 10 is a functional block diagram of a symbol tracking device.

FIG. 8 shows an exemplary result of the integral of an output value from the rotation-direction detector 105, which is performed by an integrator 108 located downstream of the rotation-direction detector 105. The integral of the output has such a shape as shown in FIG. 8 because the output corresponding to a rotation direction of the rotation of each of the symbols is integrated. In the embodiment, the output from the rotation-direction detector serves as the sampling clock signal of the error signal, and the rotation direction in phase is detected by using the integral.

As described above, the present invention has been specifically described with reference to specific embodiments according to the present invention. However, it should be understood by those skilled in the art that various modifications, combinations, sub-combinations and alterations may occur depending on design requirements and other factors insofar as they are within the scope of the appended claims or the equivalents thereof.

The embodiment in which the DSSS communication system is employed is mainly discussed herein; however, the scope of the present invention should not be limited to a system of this type. The present invention may also be applicable to communication systems other than the SS communication systems.

In summary, the present invention has been disclosed by way of exemplary embodiments, and the contents disclosed herein should not be restrictively construed. The scope of the present invention should be determined in consideration of the appended claims.

What is claimed is:

1. A wireless communication apparatus for performing reception processing while tracking a symbol timing obtained by synchronization, the wireless communication apparatus comprising:

a resampler for performing resampling to oversample a received symbol in a plurality of phases by using a sampling rate higher than a symbol rate;

a phase-error detector for obtaining a phase error in a time sequence at each sampling point where the resampling is performed;

an error-signal generator for generating an error signal on the basis of the phase error detected at each of the sampling points where the resampling is performed;

a sampling point controller for detecting an offset direction at each of the sampling points on the basis of the error signal, and for controlling an offset direction of each of the sampling points of the received symbol; and a rotation-direction detector for detecting a rotation direction of a symbol at each of the sampling points where the resampling is performed, wherein the error signal output from the error-signal generator is sampled at the time a rotation of the symbol reaches a predetermined angle in the rotation-direction detector.

2. The wireless communication apparatus according to claim 1, further comprising:

a squaring processor for raising the received symbol to the power of 2, wherein the resampler performs oversampling at a rate twice as high as the symbol rate.

3. The wireless communication apparatus according to claim 1, wherein the rotation-direction detector detects the rotation direction of the symbol in accordance with a quadrant of each of the sampling points in a phase plane and a threshold.

4. A wireless communication method for performing reception processing while tracking a symbol timing obtained by synchronization, the wireless communication method comprising the steps of:

performing resampling to oversample a received symbol in a plurality of phases by using a sampling rate higher than a symbol rate;

obtaining a phase error in a time sequence at each sampling point where the resampling is performed;

generating an error signal on the basis of the phase error detected at each of the sampling points where the resampling is performed;

detecting an offset direction at each of the sampling points on the basis of the error signal, and for controlling an offset direction of each of the sampling points of the received symbol;

detecting a rotation direction of a symbol at each of the sampling points where the resampling is performed, wherein the error signal output from the error-signal generator is sampled at the time a rotation of the symbol reaches a predetermined angle in the rotation-direction detector.

5. The wireless communication method according to claim 4, further comprising the step of:

raising the received symbol to the power of 2, wherein the resampling involves oversampling at a rate twice as high as the symbol rate.

6. The wireless communication method according to claim 4, wherein the detection of the rotation direction of the symbol occurs in accordance with a quadrant of each of the sampling points in a phase plane and a threshold.

* * * * *